United States Patent [19]

Philip et al.

[11] Patent Number: 5,698,775

[45] Date of Patent: Dec. 16, 1997

[54] DEVICE FOR LOCATING THE POSITION OF THE SEPARATION BETWEEN TWO MEDIUMS, AND A RECEPTACLE AND A DETECTION PROCESS EMPLOYING THE DEVICE

[76] Inventors: Hervé Philip, 2 rue du Lenguadoc, 34570 Pignan, France; Siegfried Maunoir, 1 rue Barthez, 34000 Montpellier, France

[21] Appl. No.: 602,248

[22] Filed: Feb. 15, 1996

[30] Foreign Application Priority Data

Mar. 3, 1995 [FR] France ............... 95 02527

[51] Int. Cl.$^6$ ............... G01N 21/01; G01N 21/85; G01N 33/18
[52] U.S. Cl. ............... 73/64.55; 73/293; 356/436
[58] Field of Search ............... 73/64.55, 293; 356/436, 442

[56] References Cited

U.S. PATENT DOCUMENTS

| 2,949,777 | 8/1960 | Ferron ............... 73/293 |
| 3,551,670 | 12/1970 | Topol et al. ............... 356/442 |
| 4,565,088 | 1/1986 | Crambes ............... 73/64.55 X |
| 4,673,819 | 6/1987 | Rose ............... 356/436 |
| 4,848,149 | 7/1989 | Fiorentino et al. ............... 73/293 |
| 4,904,878 | 2/1990 | Gipp et al. ............... 250/577 |

FOREIGN PATENT DOCUMENTS

| A-2 590 977 | 6/1987 | France. |
| C-423691 | 1/1926 | Germany. |
| 69521 | 6/1981 | Japan ............... 73/293 |
| A-58-169032 | 10/1983 | Japan. |
| 114415 | 7/1984 | Japan ............... 73/293 |
| 1390545 | 4/1988 | U.S.S.R. ............... 356/442 |
| 2176290 | 12/1986 | United Kingdom ............... 73/293 |
| WO-A-82 00710 | 3/1982 | WIPO. |

*Primary Examiner*—Hezron E. Williams
*Assistant Examiner*—Daniel S. Larkin
*Attorney, Agent, or Firm*—Hill, Steadman & Simpson

[57] ABSTRACT

A device locating a position of transition between respective layers of first and second fluids, the device comprising: proximal and distal ends, an immersible signal emitter positioned at the distal end, an immersible signal receptor also fixed at the distal end but separated relative to said signal emitter, and a gap separating said center and receptor to receive fluid, the receptor being arranged to receive a signal from said emitter through fluid in said gap and such that the characteristics of the received signal vary depending on the characteristics of the fluid in the gap, wherein the signal emitter and signal receptor are arranged on a common horizontal axis, wherein the signal emitter is a visible light source, and wherein the signal receptor is a mirror aligned at approximately 45° from horizontal to deflect the light signal vertically upward to provide a signal directly visible by a person.

22 Claims, 2 Drawing Sheets

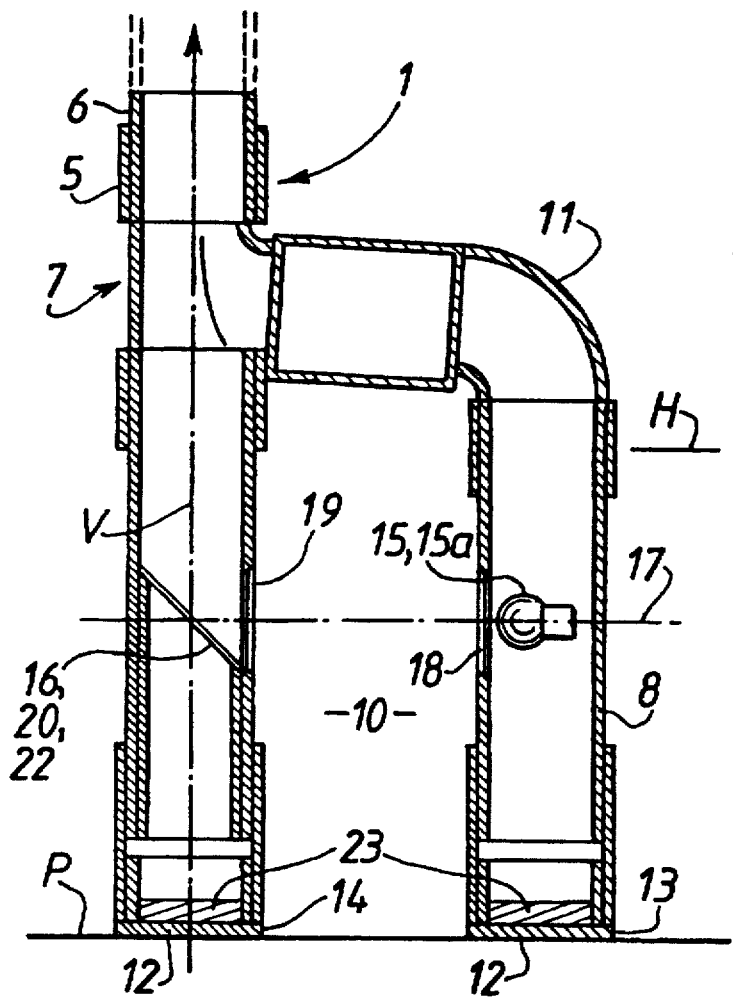
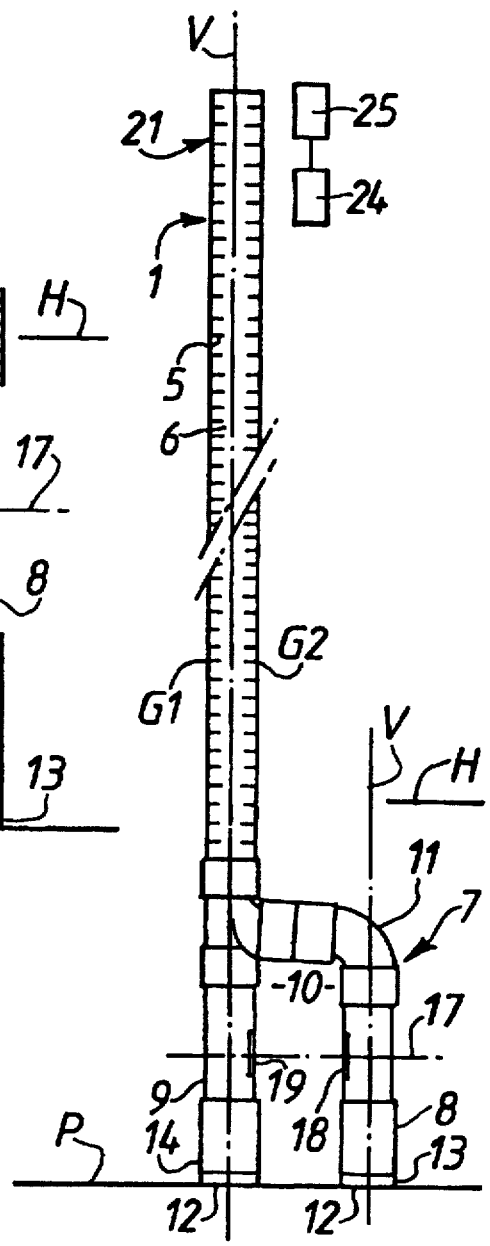
FIG. 2
FIG. 1

DEVICE FOR LOCATING THE POSITION OF THE SEPARATION BETWEEN TWO MEDIUMS, AND A RECEPTACLE AND A DETECTION PROCESS EMPLOYING THE DEVICE

BACKGROUND OF THE INVENTION

The invention relates to a device for locating the position of the separation between two fluid mediums displaying different specific physical characteristics more specifically the invention relates to detecting the level or measuring the height of mud accumulated at the bottom of a receptacle, such as a septic tank.

The problem of measuring the height of accumlated mud crops up in a number of circumstances. It can be of concern in water treatment works or processes such as decanters, septic tanks, digesters, or even purification ponds. In a more general manner, it can be a matter of concern in any natural or artificial liquid medium in which sediments can be accumulated.

Devices intended to detect the level of mud or to measure the height of mud accumulated in such a context are already known.

The so-called "Secchi" disk consists of a white coloured disk made of enamelled iron, porcelain or any other equivalent material with a 200 mm diameter. Holes are pierced in the disk according to a given configuration. Such a disk is progressively dipped into the medium in which the detection or the measuring is to be performed. The separation between the decanted water and the mud is located by the fact that the disk ceases to be visible.

However, such a device has the disadvantage of an obvious lack of safety since the operator may no longer see the disk while it has not yet reached the level of the mud. This is particularly the case when the decanted water is very cloudy.

Infrared detectors whose technology is far more sophisticated than the "Secchi" disk described above, are also known.

Nevertheless, such infrared detectors also have the disadvantage that a small obstacle can interfere with the measurements and therefore tamper the indications obtained.

Ultrasonic detectors are also known. However, they provide a response which depends on the quality of the density of the mud. Such detectors therefore require a specific calibration for each measuring site and, although they are well suited for permanently fixed devices, they are not very convenient in the case of devices intended to be used in a moveable manner.

Finally, the use of peristaltic pumps is also known. A graded, ballasted, flexible transparent tube connected to a pump is submerged in the medium in which the detection or measurement is to be performed. When the tube reaches the level of the mud, the liquid sucked in is darker and it is then possible to evaluate the thickness of the level of the mud according to the difference between the layer of decanted water and the working height of the reservoir.

This system certainly has the advantage of a great reliability and precision. On the other hand, it is both costly and difficult to maintain. Finally, it requires an accumulator battery in order to operate.

SUMMARY OF THE INVENTION

The purpose of the invention is therefore to eliminate the disadvantages of the presently known devices and, more specifically, to provide a device which is simultaneously precise, easy to use and of low cost.

For this purpose, the invention provides a device for locating the position of the separation between two fluid mediums displaying different specific physical characteristics comprising a rigid support, extended along a longitudinal direction; means for emitting waves in a transversal direction, carried by the support towards a proximal end or first extreme part; means for receiving the waves emitted by the emission means, carried by the support towards the first extreme part; the emission means and the reception means being spaced from one another by a certain known distance along a transversal direction and providing between them a free space in which the medium can be located; means for transmitting the waves received by the reception means along the support and until its distal end or distant second extreme part; the received emitted waves which are transmitted being chosen because they display physical characteristics which depend on the specific physical characteristics of the fluid medium in which the emission and reception means are located; means for analyzing the waves transmitted is located towards the second extreme part of the support or downstream thereof; so that the passage of the emission and reception means past the separation between the two mediums, towards the first extreme part of the device, results in a significant change in the physical characteristics of the waves analysed.

In an embodiment, the wave emission means, the wave reception means, and the wave transmission means are of the optical type.

In another embodiment, the device further includes visual or sound information means coupled to the analysis means, the information means made active when the emission and reception means pass from one medium to another.

In another embodiment, the device includes means for returning the waves received by the reception means along a transversal direction, according to a longitudinal direction.

The support consists of a main tube extending along the longitudinal direction, prolongated and terminated, towards its first extreme part, by two lengths of tube, of longitudinal direction, parallel to each another and spaced from one another, the first enclosing the emission means and the second enclosing the reception means, the two lengths of tube being closed towards their free ends.

In another embodiment, the two lengths of tube have their free ends located on one same plane transversal with respect to the longitudinal direction. The main tube and the second length are coaxial. The first length is connected to the main tube by an elbow. The support can be telescopic, made up of several parts associated together in a fixed or non-fixed manner.

One or two length graduations in the longitudinal direction are provided along the support. The zero of the first graduation is the transversal line connecting the two emission and reception means. The zero of the second graduation is the free end of the first and second lengths.

Each of the first and second lengths of tube includes a protected side-window, capable of allowing the passage of the received emitted waves. The emission and reception means are located opposite to each window, respectively.

In an embodiment, the device includes a ballast located towards the first and second lengths, particularly towards their free ends.

In an embodiment, the emission means are means for emitting white light. In this embodiment, the reception and return means are common. They consist of a mirror inclined 45° with respect to the longitudinal direction.

Such a device makes up a device for detecting the level or for measuring the height of the mud accumulated at the bottom of a receptacle such as a septic tank.

However, the device is applicable for analogous cases.

In an embodiment, the invention concerns a receptacle such as a septic tank or another analogous application, intended to receive fluid mediums, particularly mud accumulated at the bottom and decanted water at the surface, to which is associated at least one device such as previously mentioned.

This device is either moveable, or associated with the receptacle in a fixed manner. In the latter case, it is possible to provide several devices whose transversal lines connecting the emission and reception means are placed at different levels.

Finally, the invention concerns a process for detecting the level of the mud accumulated at the bottom of a receptacle such as previously defined, by means of a device such as previously described.

In this process, the first end of the device is arranged vertically, with regards to the receptacle. Then, the device is progressively submerged in the receptacle and its content.

When a significant change in the physical characteristics of the waves analysed is detected, the value (a) is marked on the first graduation. This value indicates the level of the mud with respect to the level of the free surface of the receptacle's content.

In an embodiment, the process also makes it possible to measure the height of the mud. In this case, one continues to submerge the device in the receptacle until the free ends of the first and second lengths of tube touch the bottom. The value (b) is then marked on the second graduation. The value of the height of the mud is obtained from the difference (b)−(a).

These and other aspects and features of the invention will be more clearly understood upon reading the detailed description which follows with reference to the attached drawings.

BRIEF DESCRIPTION OF THE DRAWINGS

FIG. 1 is a schematic elevation view of a device according to the invention.

FIG. 2 is a schematic, partial sectional view, in an enlarged scale, of the device of FIG. 1.

DETAILED DESCRIPTION OF THE PRESENTLY PREFERRED EMBODIMENTS

Figure 3:
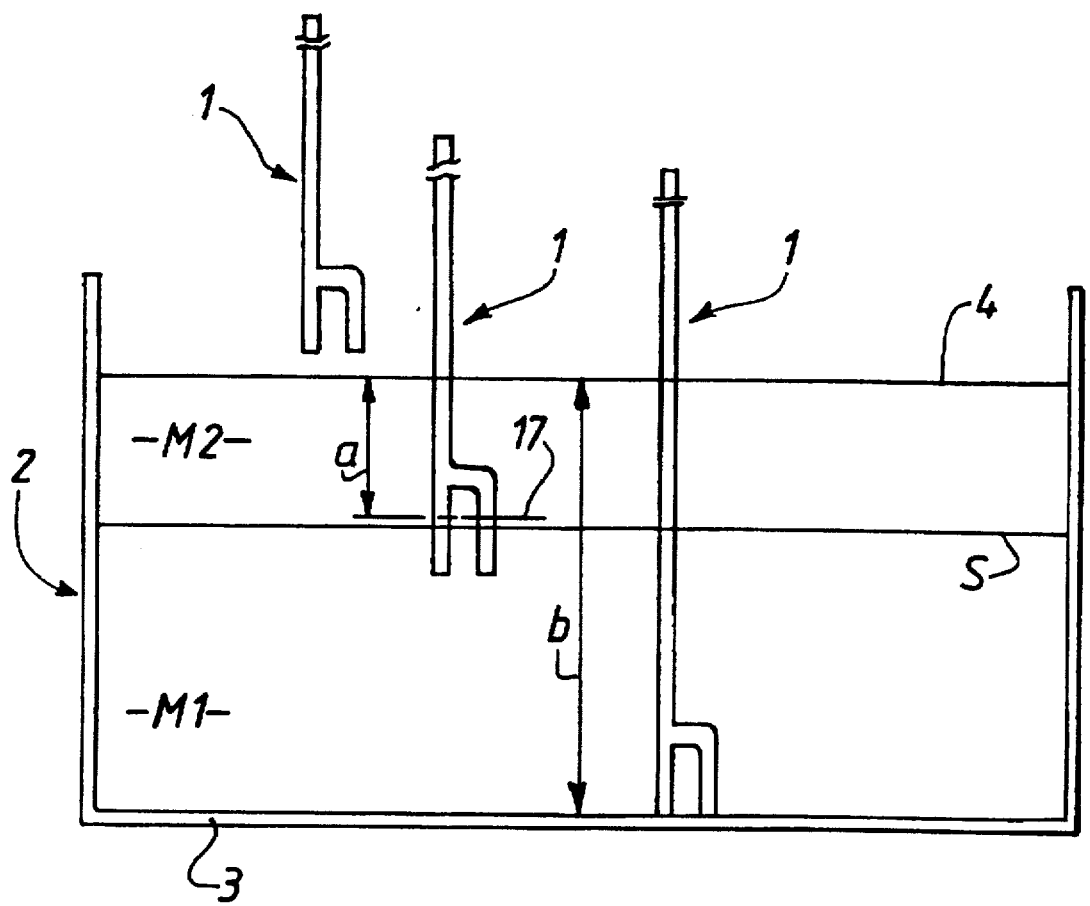
FIG. 3 is a schematic cross-sectional view across a vertical plane, illustrating the implementation of the device in the case of a receptacle containing mud at the bottom and above the decanted water.

As illustrated in FIG. 3, the invention thus concerns a device 1 which, generally speaking, makes it possible to locate the position of a separation S between two fluid mediums M1 and M2 displaying different specific physical characteristics.

More specifically, the device 1 comprises a device for detecting the level or for measuring the height of the mud accumulated at the bottom of a receptacle 2, such as a septic tank.

In this case, medium M1 consists of mud and medium M2 consists of decanted water.

The mud of medium M1 rest on the bottom 3 of the receptacle. The decanted water of medium M2 is located above the mud M1 and defines the free surface 4 of the content M1/M2 of the receptacle. There is a separation S between the mud of medium M1 and the decanted water of medium M2.

In the embodiment described, it is assumed that the bottom 3 is substantially flat and horizontal and the surface is itself substantially flat and horizontal. Nevertheless, the invention is applicable when this is not exactly the case.

Furthermore, the invention also relates to applications analogous to the septic tank as well as, in a more general manner, to other fluid mediums.

The physical characteristics which are considered for the mediums M1 and M2 are, in this case, optical characteristics, particularly transparency or opacity.

The device 1 firstly comprises a support 5 as illustrated in FIGS. 1 and 2.

Preferably this support 5 is rigid. It extends along a longitudinal direction V between proximal and distal ends. When the device is implemented in the case of a septic tank, the longitudinal direction V is the vertical direction.

In the embodiment shown in the drawings, the support 5 comprises a main tube 6 prolongated and terminated towards its distal end or first extreme part 7 by a first and a second lengths of tube 8 and 9.

The tube 6 and the lengths of tube 8, 9 extend in the longitudinal direction. The two lengths of tube 8, 9 are parallel to each other and spaced from one another. A free space 10 is provided between them.

The tube 6 and the second length of tube 9 are coaxial whereas the first length of tube 8 is spaced from the colinear assembly formed by the tube 6 and the second length of tube 9.

For this purpose, an elbow 11 is provided between the first length of tube 8 and the interface between the tube 6 and the second length of tube 9.

The two lengths of tube 8, 9 are closed by plugs 12 towards their free ends, particularly at their free ends 13 and 14, respectively. These two free ends 13, 14 are located on one same plane P transversal with respect to the longitudinal direction V.

In the embodiment which has just been described, the tube 6 and the lengths of tube 8 and 9 communicate internally with one another.

Furthermore, the tube 6 extends in the longitudinal direction V for a substantial length much greater than that of the first and second lengths 8, 9.

For example, the tube 6 and the lengths of tube 8 and 9 can have a diameter on the order of approximately 40 mm. The two lengths of tube 8 and 9 can have a length in the order of 15 cm, whereas the tube 6 can have a length on the order of 1.5 m. Finally, the spacing between the two lengths of tube 8 and 9 can be on the order of 7 cm.

These figures are purely indicative of a fully satisfactory embodiment.

If necessary, the support 5 and particularly the tube 6 can be telescopic. For this purpose, the latter is made up of several parts. These parts can be associated together in a fixed or non-fixed manner (not shown).

The device 1 secondly includes wave emission means 15 and wave reception means 16.

The means 15 and 16 are enclosed within the first and second lengths of tube 8 and 9, respectively.

The wave emission and reception means 15 and 16 are thus carried by the support 5 towards its free first extreme part 7. These wave emission and reception means 15 and 16 are directed along one same axis 17 extending parallel to a transversal direction H perpendicular to the longitudinal direction V.

In the implementation considered, the transversal direction H is therefore horizontal. The two lengths of tube 8 and 9 are each provided with a window 18 and 19, respectively, arranged laterally. The two windows 18 and 19 are facing the space 10 and have axis 17 as their axis. The emission 15 and reception 16 means are placed opposite to the corresponding windows 18 and 19.

The windows 18 and 19, which are protected, are suited for the passage of the waves emitted/received by the emission 15 and reception 16 means.

The device 1 thirdly comprises means 20 for transmitting the waves received by the reception means 16. These transmission means 20 are housed in the second length 9 and in the tube 6, respectively.

The transmission means 20 ensure the transmission of the waves received by the reception means 16 along the support 5 and until approximately its proximal end of second extreme part 21 opposite to the two lengths 8 and 9.

The waves emitted, received and transmitted by means 15, 16 and 20 are chosen because they display physical characteristics which depend on the specific physical characteristics of the fluid medium M1, M2 in which the emission 15 and reception 16 means are located.

In the embodiment more particularly considered, the emission means 15, reception means 16, and transmission 20 means are of optical type.

Furthermore, there are provided means 22 for returning the waves received by the reception means 16 along the axis 17 of transversal direction according to a longitudinal direction corresponding to the axis of the second length of tube 9 and of the tube 6.

In the embodiment shown in the figures, the reception 16 and return 22 means are common and they consist of a mirror inclined 45° with respect to the longitudinal direction V. This mirror is also part of the transmission means 20. Furthermore, the emission means 15 consists of means for emitting white light.

In this case, the emission means 15 includes a light source 15a and power supply means for the latter, not shown.

According to one possible embodiment, the power supply means include two externally protruding terminals.

These terminals make contact and ensure the electrical continuity when the device is submerged in the mud.

Taking into consideration the structure which has just been described, it appears that the emission means 15 and reception means 16 are spaced from one another by a known distance and separated by the free space 10 in which the media M1 and M2 can be located.

The device 1 also comprises a sensor in the form of means 24 for analysing the waves transmitted by the means 20. This analysis means 24 is located towards the proximal end or second extreme part 21 or even downstream thereof, i.e. beyond.

If necessary, there can be coupled to the sensor or analysis means 24 some visual or sound information means 25 which are made active when the emission and reception means 15 and 16 pass from one medium to another past the separation S.

If necessary, there is provided a ballast 23 located towards the first and second lengths 8 and 9, in towards their free ends 13 and 14.

The support 5 comprises, lengthwise, in the longitudinal direction V, two graduations G1 and G2, respectively. These graduations are length graduations. The first graduation G1 has as its zero the axis 17 and it extends until the second end 21. The second graduation G2 has as its zero the free ends 13 and 14 of the first and second lengths 8 and 9 and it also extends towards the second extreme part 21.

The analysis means are either visual or automatic.

The device described is such that, with the emission means 15 implemented, the passage of the emission means and reception means 15 and 16 and the axis 17 past the separation S results in a significant change in the physical characteristics of the waves analysed. This change makes it possible to locate the position of this separation S.

The invention also relates to a receptacle such as 2 to which is associated a device such as 1.

This device 1 is either moveable, or associated to the receptacle 2 in a fixed manner.

In the latter case, the receptacle 2 can include several devices such as 1 whose axes 17 are placed at different levels.

The invention also relates to a process for detecting the level of the mud M1 accumulated at the bottom of the receptacle 2 by means of the device 1 which has just been described.

For this purpose, the device 1 is arranged with its longitudinal direction vertical, opposite to the receptacle 2 and its content M1, M2, with the first end 7 facing the free surface 4 and the second extreme part 21 placed above the first extreme part 7.

The device 1 is progressively submerged in the receptacle 2 and its contents M1 and M2 starting with its first extreme part 7.

With the emission means 15 implemented, a significant change is detected in the physical characteristics of the waves analysed when the axis 17 passes the separation S. The value (a) of the first graduation G1 is then marked.

This value (a) indicates the level of the mud M2, i.e. S with respect to the level of the free surface 4.

This process also makes it possible to measure the height of the mud.

In this case, after measuring the value (a), one continues to submerge the device in the receptacle 1 towards the bottom 3 until the free ends 13 and 14 touch the bottom 3. The value (b) is then marked on the second graduation.

The value of the height of the mud M1 is obtained from the difference (b)−(a).

The values (a) and (b) are measured at the intersection of the free surface 4.

What is claimed is:

1. A device for locating a position of transition between respective layers of first and second fluids, the device comprising:

proximal and distal ends;

an immersible signal emitter positioned at the distal end;

an immersible signal receptor also fixed at the distal end but separated relative to said signal emitter; and a gap separating said emitter and receptor to receive fluid, the receptor being arranged to receive a signal from said emitter through fluid in said gap and such that the characteristics of the received signal vary depending on the characteristics of the fluid in the gap, wherein the signal emitter and signal receptor are arranged on a common horizontal axis, wherein the signal emitter is a visible light source, and
wherein the signal receptor is a mirror aligned at approximately 45° from horizontal to deflect the light signal vertically upward to provide a signal directly visible by a person.

2. The device according to claim 1, further comprising a sensor for sensing substantial change in the characteristics of the signal received by the signal receptor.

3. The device according to claim 2, further comprising either a visual or audible alarm operable with the sensor such that the alarm is actuated when said substantial change is sensed.

4. The device according to claim 1, further comprising:
a housing arranged to respectively enclose the signal emitter and signal receptor to prevent fluid contact thereon;
a transparent window in the housing adjacent the signal emitter and facing the signal receptor; and
a transparent window in the housing adjacent the signal receptor and facing the signal emitter, the gap being defined between the windows.

5. The device according to claim 4, wherein the housing includes a rigid support having an end on which the signal emitter and signal receptor are secured.

6. The device according to claim 5, wherein the rigid support is a hollow tube, and the signal is carried upwardly from the receptor through an interior of the tube.

7. The device according to claim 6, wherein the housing is generally h-shaped, such that the support tube and a portion of the housing enclosing the signal receptor are coaxially aligned, and such that a portion of the housing enclosing the signal emitter is offset therefrom.

8. The device according to claim 1, wherein the device is manually moveable to immerse the signal emitter and signal receptor through the fluid layers.

9. A septic tank system comprising:
a septic tank; and
a level measuring device for locating a position of transition between respective layers of first and second fluids, the device including:
an immersible signal emitter;
an immersible signal receptor fixed and separated relative to said signal emitter; and
a gap separating said emitter and receptor to receive fluid, the receptor being arranged to receive a signal from said emitter through the fluid in said gap and such that the characteristics of the received signal vary depending on the characteristics of the fluid in the gap,
wherein the signal emitter and signal receptor are arranged on a common horizontal axis,
wherein the signal emitter is a visible light source, and
wherein the signal receptor is a mirror aligned at approximately 45° from horizontal to deflect the light signal vertically upward to provide a signal directly visible by a person.

10. The septic tank system according to claim 9, wherein the level-measuring device further includes a sensor for sensing a substantial change in the characteristics of the signal received by the signal receptor.

11. The septic tank system according to claim 10, wherein the level-measuring device further comprises either a visual or audible alarm operable with the sensor such that the alarm is actuated when said substantial change is sensed.

12. The septic tank system according to claim 9, wherein the level-measuring device further includes:

a housing arranged to respectively enclose the signal emitter and signal receptor to prevent fluid contact thereon;
a transparent window in the housing adjacent the signal emitter and facing the signal receptor; and
a transparent window in the housing adjacent the signal receptor and facing the signal emitter, the gap being defined between the windows.

13. The septic tank system according to claim 12, wherein the housing includes a rigid support having an end on which the signal emitter and signal receptor are secured.

14. The septic tank system according to claim 13, wherein the rigid support is a hollow tube, and the signal is carried upwardly from the receptor through an interior of the tube.

15. The septic tank system according to claim 14, wherein the housing is generally h-shaped, such that the support tube and a portion of the housing enclosing the signal receptor are coaxially aligned, and such that a portion of the housing enclosing the signal emitter is offset therefrom.

16. The device according to claim 9, wherein the device is manually moveable to immerse the signal emitter and signal receptor through the fluid layers.

17. The septic tank system according to claim 9, wherein the device is moveable relative to the tank.

18. The septic tank system according to claim 9, wherein the device is fixed to the tank so that the gap is at a predetermined level.

19. The septic tank system according to claim 10, comprising a plurality of level-measuring devices, the devices being fixed so that their respective gaps are at various predetermined levels.

20. A process for detecting a level of mud accumulated at a bottom of a septic tank under a layer of water, the process comprising the steps of:
a) providing a device for locating a position of transition between the respective mud and water layers, the device having opposite proximal and distal ends and including:
a rigid support extending along a longitudinal direction between the proximal and distal ends;
a signal emitter secured relative to the support generally at the distal end;
a signal receptor secured relative to the support for receiving the waves transversely from the signal emitter;
a gap separating the signal emitter and signal receptor, the gap being open to receive fluid such that the waves pass from the emitter the receptor means through the gap, such that the signal exhibits different characteristics when passed through the mud or water occupying the gap; and
a sensor for sensing the waves transmitted to sense a change in signal characteristics,
wherein the signal emitter and signal receptor are arranged on a common horizontal axis,
wherein the signal emitter is a visible light source, and
wherein the signal receptor is a mirror aligned at approximately 45° from horizontal to deflect the light signal vertically upward to provide a signal directly visible by a person;
b) positioning the device above the tank so that the longitudinal direction is vertical, proximal end upward;
c) progressively submerging the device into the water, distal end first; and
d) detecting a significant change in the signal characteristics with the sensor when the gap passes from the water layer to the mud layer.

21. The process according to claim 20, wherein the device further includes first graduation marks disposed along the support in the longitudinal direction and having an origin at a longitudinal position of the signal emitter, the process further comprising:

marking a value (a) on the first graduation marks to indicate a level of the mud with respect to a level of an upper surface of the water.

22. A process for detecting a level of mud accumulated at a bottom of a septic tank under a layer of water, the process comprising the steps of:

a) providing a device for locating a position of transition between the respective mud and water layers, the device having opposite proximal and distal ends and including:

a rigid support extending along a longitudinal direction between the proximal and distal ends;

a signal emitter secured relative to the support generally at the distal end;

a signal receptor secured relative to the support for receiving the waves transversely from the signal emitter;

a gap separating the signal emitter and signal receptor, the gap being open to receive fluid such that the waves pass from the emitter the receptor means through the gap, such that the signal exhibits different characteristics when passed through the mud or water occupying the gap; and a sensor for sensing the waves transmitted to sense a change in signal characteristics, wherein the device includes graduation marks disposed along the support in the longitudinal direction, having an origin at a longitudinal position of a tip of the distal end, wherein the signal emitter and signal receptor are arranged on a common horizontal axis, wherein the signal emitter is a visible light source, and wherein the signal receptor is a mirror aligned at approximately 45° from horizontal to deflect the light signal vertically upward to provide a signal directly visible by a person;

b) positioning the device above the tank so that the longitudinal direction is vertical, with the proximal end upward;

c) progressively submerging the device into the water, distal end first;

d) marking a value (a) on the graduation marks to indicate a level of the mud with respect to a level of an upper surface of the water;

e) continuing to submerge the device in the tank until the distal end touches a bottom of the tank;

f) detecting a significant change in the signal characteristics with the sensor when the gap passes from the water layer to the mud layer; and g) marking a value (b) on the graduation marks so that the height of the mud is calculated from the difference (b–a).

* * * * *